United States Patent [19]

Heidenreich et al.

[11] Patent Number: 4,594,204

[45] Date of Patent: Jun. 10, 1986

[54] PROCESS FOR ANNEALING THERMOPLASTICALLY-SHAPED PLASTICS PARTS

[75] Inventors: Klaus Heidenreich, Leverkusen; Hans-Werner Depcik, Duesseldorf; Hans Radojewski, Leverdusen, all of Fed. Rep. of Germany

[73] Assignee: Bayer Aktiengesellschaft, Leverkusen, Fed. Rep. of Germany

[21] Appl. No.: 653,135

[22] Filed: Sep. 24, 1984

[30] Foreign Application Priority Data

Oct. 5, 1983 [DE] Fed. Rep. of Germany ....... 3336244

[51] Int. Cl.$^4$ ............................................... B29C 35/08
[52] U.S. Cl. ...................................... 264/25; 264/235; 264/346; 425/174.4
[58] Field of Search .......................... 264/25, 235, 346; 425/174.4

[56] References Cited

U.S. PATENT DOCUMENTS

| | | | |
|---|---|---|---|
| 3,155,756 | 11/1964 | Hechelhammer et al. | 264/345 |
| 3,200,182 | 8/1965 | Hechelhammer et al. | 264/346 |
| 3,317,642 | 5/1967 | Bailey | 264/346 |
| 3,326,854 | 6/1967 | Jackson et al. | 264/235 |
| 3,445,561 | 5/1969 | Huff et al. | 264/345 |
| 4,076,071 | 2/1978 | Rosenkranz et al. | 264/25 |
| 4,079,104 | 3/1978 | Dickson et al. | 264/25 |
| 4,260,567 | 4/1981 | Poppe et al. | 264/346 |
| 4,264,558 | 4/1981 | Jacobsen | 264/235 |
| 4,379,099 | 4/1983 | Ota et al. | 264/346 |
| 4,482,518 | 11/1984 | Brady, Jr. | 264/346 |

*Primary Examiner*—Jeffery Thrulow
*Attorney, Agent, or Firm*—Connolly and Hutz

[57] ABSTRACT

The present invention reduces within a short period of time the internal stresses in plastics bottles by annealing with infra-red radiation, in particular by specifically exposing critical points to radiation.

3 Claims, No Drawings

PROCESS FOR ANNEALING THERMOPLASTICALLY-SHAPED PLASTICS PARTS

The present invention relates to a process for annealing thermoplastically-shaped plastics parts in order to reduce internal stresses by charging the plastics parts with heat after shaping.

Internal stresses may occur in finished parts by the thermoplastic processing stages and only cause cracks to form over the course of time, thereby rendering the object unusable. This is particularly the case for bottles of plastics material where stress cracks, due to the poor surface tension of the detergents, are alleviated.

Annealing in an oil-bath is known whereby the parts are immersed in an oil-bath.

This process suffers from the disadvantage that a heated oil-bath entails substantial pollution control measures. It is also very costly to clean the annealed plastics parts. The process is therefore mainly used for annealing test samples.

It is also known to transmit heat to the plastics parts through air using convection. This may be done batch-wise in a heating chamber or continuously in a continuous furnace, the soaking time generally being more than 30 min, depending on the wall thickness.

The efficiency factor is poor when heat is transmitted through air. The long soaking time necessitates bulky apparatus which are, for the most part, also provided with working parts, such as ventilators. The subsequent processing of the extrusion-blown plastics parts for example, necessitates an additional separate operation, in the case of heating chambers, and a large requirement of space, in the case of continuous furnaces, which is difficult to meet in assembly lines. The consumption of energy is also very high due to the long soaking time which is determined by the thickest point.

It is also known to heat films or plates by infra-red radiation to a shaping temperature above the softening point.

This process pursues entirely different objects, both from the point of view of the type of problem and the result of working, that is the re-shaping of a flat body into a spatial body. Softening always produces undesirable shaping or shrinking.

An object of the present invention is to provide a process for annealing, which enables the stress to be quickly and specifically regulated using simple technical means, wherein the apparatus used is dimensionally compact and suitable for mounting behind the processing apparatus.

This object is achieved according to the present invention by transmitting the heat to the plastics part by infra-red radiation.

Transmitting the heat directly by radiation which is then absorbed by the plastics material concerned produces specific intensive heating thereby enabling a rapid reduction of the internal stresses caused by thermoplastic shaping. Infra-red emitters are particularly suitable as the charged energy is substantially completely used, owing to the exact metering. The technical expenditure is minimal. The apparatus can also be connected behind existing processing apparatus due to the small dimensions thereof.

In a particular embodiment of the present process infra-red rays having a radiation maximum of from 1200 nm to 5000 nm are used.

The above radiation maxima have proved effective particularly in the case of different wall thicknesses.

In another embodiment of the present process a temperature is produced by the transmitted heat which is on average from 5 to 30%, in particular from 10 to 20% below the Vicat-softening temperature $VST/_B$ (DIN 53 460).

A uniform, rapid reduction of the internal stresses produced during shaping is achieved by exactly adjusting the temperature at any point on the plastics part to just below the softening point ($VST/_B$ Vicat softening temperature).

In a further embodiment of the present process the plastics parts are exposed to radiation for a period of from 20 to 240 seconds, particularly from 30 to 120 seconds.

The advantage of this process is, in particular, that at a temperature just below the softening point the internal stresses can be more rapidly reduced with the result that the apparatus required for this need not be of a great length.

In an embodiment of the present process, hollow bodies of polycarbonate are exposed to radiation as shaped plastics parts.

Hollow bodies, such as bottles, cans etc., which are at least partially composed of polycarbonate, are particularly suitable as re-usable containers for foodstuffs and after annealing remain unharmed by each cleansing after use.

Thermoplastic aromatic polycarbonates, polycarbonates which are obtained by reacting diphenols, particularly diphenols of dihydroxy diarylalkanes, with phosgene or diesters of carbonic acid may be used and dihydroxy diarylalkanes whose aryl radicals carry methyl groups or halogen atoms in the o- and/or m-position to the hydroxyl group are also suitable in addition to the unsubstituted dihydroxy-diarylalkanes. Branched polycarbonates are also suitable. Monophenols, for example, serve as chain terminators. Trisphenols or tetraphenols, for example, serve as branching agents.

The polycarbonates have average molecular weights Mw of from 10,000 to 100,000, preferably from 20,000 to 40,000, determined by measuring the relative viscosity in $CH_2Cl_2$ at 25° C. and at a concentration of 0.5 g/per 100 ml.

Suitable diphenols are, for example, hydroquinone, resorcinol, 4,4'-dihydroxyphenyl, bis-(hydroxyphenyl)-alkanes, such as $C_1$–$C_8$ alkylene or $C_2$–$C_8$ alkylidene bisphenols, bis-(hydroxyphenyl)-cycloalkanes, such as $C_5$–$C_{15}$ cycloalkylene- or $C_5$–$C_{15}$-cycloalkylidene bisphenols, bis(hydroxy-phenyl)-sulpides, -ethers, -ketones, sulphoxides or sulphones. Moreover, $\alpha,\alpha'$-bis-(hydroxy-phenyl)-diisopropylbenzene and the corresponding nuclear-alkylated or nuclear-halogenated compounds are also suitable. Polycarbonates based on bis-(4-hydroxyphenyl)-propane-2,2 (bisphenol A), bis-(4-hydroxy-3,5-dichlorophenyl)-propane-2,2 (tetrachlorobisphenol A), bis-(4-hydroxy-3,5-dibromophenyl)-propane-2,2 (tetrabromobisphenol A), bis-(4-hydroxy-3,5-dimethyl-phenyl)-propane-2,2 (tetramethylbisphenol A), bis-(4-hydroxy-phenyl)-cylcohexane-1,1 (bisphenol Z) and based on trinucleii bisphenols, such as $\alpha, \alpha'$-bis (4-hydroxyphenyl)-p-di-isopropylbenzene. Further suitable diphenyls and the production of the polycarbonates are described, for example, in U.S. Pat. Nos. 3 028 365 (he 1609), 3 062 781 (he 1818) and 3 879 347 (le A 14 240).

EXAMPLE 1

The formation of cracks in extrusion-blown cans of polycarbonate having the following characteristics:

Base: 150×80 mm
Thickness: 1–6 mm
Total height: 290 mm
Neck of bottle: 42 mm
Contents: 2,4 l
Weight: 180 g are examined in an irradiated and unirradiated state by the known Tetra test.

To this end, an extrusion-blown can of polycarbonate which has not been subsequently processed (annealed) is placed in a glass container. Both the polycarbonate bottle and the glass container are filled to about 2 cm with carbon tetrachloride at room temperature.

Result

Visible cracks occur within 60 seconds in areas of high internal stresses, particularly in the pintch-off area of the base.

Then a can produced in the same manner is subjected to IR-radiation with the base thereof facing the emitter (emitter: Heraeus MBS 1200/250, nominal output: 38.4 kW/m$^2$, spacing of the emitter from the base: 60 mm, duration: 60 sec).

The base of the bottle is thus heated to about 130° C. The same Tetra test is subsequently carried out.

Result

No stress cracks appeared even after storing for 5 min in carbon tetrachloride.

EXAMPLE 2

An extrusion-blown bottle with
Diameter: 39 mm
Height: 234 mm
Wall thickness: 1–3 mm
Content: 1 l
Weight: 70 g is cleaned in an unirradiated and irradiated state with 2% NaOH at 80° C. for 20 min.

Result

Without subsequent processing (annealing) the bottles have continuous cracks in the base even after the first cleaing operation (leakages). After annealing, as described in the previous Example, the bottle shows no cracks even after more than 50 cleaning operations and thus can only be used as a re-usable bottle after annealing.

We claim:

1. A process for annealing thermoplastically-shaped plastics parts for reducing the internal stresses, by treating the plastics parts after shaping with heat wherein the heat is transmitted to the plastics parts for 20–240 seconds by infra-red radiation of from 1200 nm to 5000 nm to produce a temperature of from 10 to 20% below the Vicat-softening temperature of the plastics parts.

2. An annealing process according to claim 1 wherein the plastic parts are exposed to the infra-red radiation for 30 to 120 seconds.

3. An annealing process according to claim 1 wherein the shaped plastics parts are hollow bodies of polycarbonate.

* * * * * ved

REEXAMINATION CERTIFICATE (3448th)

United States Patent [19]

Heidenreich et al.

[11] B1 4,594,204

[45] Certificate Issued Mar. 3, 1998

[54] PROCESS FOR ANNEALING THERMOPLASTICALLY-SHAPED PLASTICS PARTS

[75] Inventors: Klaus Heidenreich, Leverkusen; Hans-Werner Depcik, Duesseldorf; Hans Radojewski, Leverdusen, all of Germany

[73] Assignee: Bayer Aktiengesellschaft, Leverkusen, Germany

Reexamination Request:
No. 90/003,800, Apr. 21, 1995

Reexamination Certificate for:
Patent No.: 4,594,204
Issued: Jun. 10, 1986
Appl. No.: 653,135
Filed: Sep. 24, 1984

[30] Foreign Application Priority Data

Oct. 5, 1983 [DE] Germany ..................... 3336244

[51] Int. Cl.$^6$ ............................................ B29C 35/08
[52] U.S. Cl. .................... 264/492; 264/235; 264/346; 425/174.4
[58] Field of Search ........................... 264/25, 235, 346, 264/492, 458, 476

[56] References Cited

U.S. PATENT DOCUMENTS

| | | | |
|---|---|---|---|
| 3,975,618 | 8/1976 | Goos et al. | 219/388 |
| 4,128,379 | 12/1978 | Hartitz et al. | 425/446 |
| 4,147,487 | 4/1979 | Dickson et al. | 425/174.4 |
| 4,339,303 | 7/1982 | Frisch et al. | 156/629 |

FOREIGN PATENT DOCUMENTS

| | | | |
|---|---|---|---|
| 1939053 | 7/1968 | Germany | 29/25 |

OTHER PUBLICATIONS

Lexan® Technifacts, *Radiant Panel Annealing Recommendations* . . . (Mar. 21, 1978).

Lexan® Technifacts, *Annealing Practice For Lexan® Resin*, (Aug. 1978).

*Encyclopedia of Polymer Science and Engineering*, "Annealing" (1965).

*Primary Examiner*—Leo B. Tentoni

[57] ABSTRACT

The present invention reduces within a short period of time the internal stresses in plastics bottles by annealing with infra-red radiation, in particular by specifically exposing critical points to radiation.

REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1-3 are cancelled.

* * * * *